Figure 1:
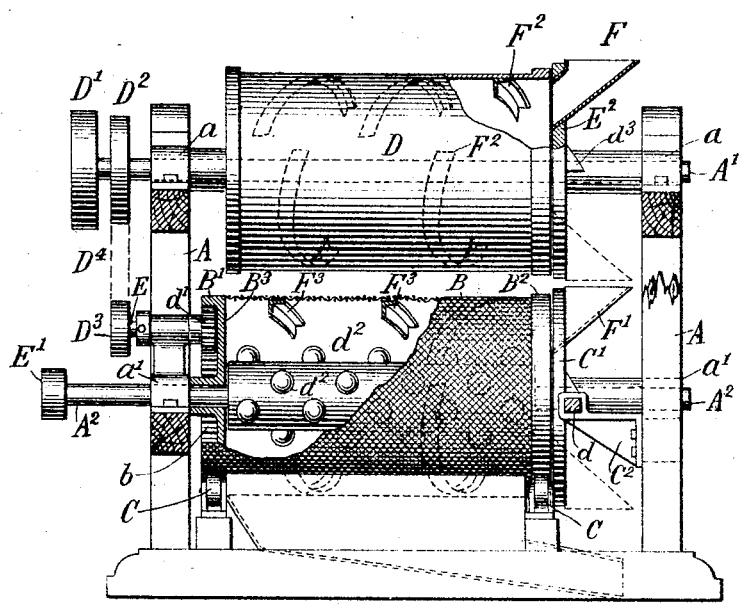

No. 774,725. PATENTED NOV. 8, 1904.
W. A. HASTINGS & N. J. HARRINGTON.
PROCESS OF CLEANING COFFEE.
APPLICATION FILED MAR. 10, 1903.
NO MODEL.

Witnesses:
S. S. Dunham
Geo Jos Constantine

Inventors
William A. Hastings
and Neal J. Harrington
by Kerr, Page & Cooper, Attys.

No. 774,725. Patented November 8, 1904.

UNITED STATES PATENT OFFICE.

WILLIAM A. HASTINGS, OF SACRAMENTO, AND NEAL J. HARRINGTON, OF OAKLAND, CALIFORNIA, ASSIGNORS, BY MESNE ASSIGNMENTS, TO COMMERCIAL COFFEE AND TRADING COMPANY, OF JERSEY CITY, NEW JERSEY, A CORPORATION OF NEW JERSEY.

PROCESS OF CLEANING COFFEE.

SPECIFICATION forming part of Letters Patent No. 774,725, dated November 8, 1904.

Application filed March 10, 1903. Serial No. 147,075. (No specimens.)

*To all whom it may concern:*

Be it known that we, WILLIAM A. HASTINGS, residing in the city and county of Sacramento, and NEAL J. HARRINGTON, residing in Oakland, county of Alameda, State of California, citizens of the United States, have invented certain new and useful Improvements in Processes of Cleaning Coffee; and we do hereby declare the following to be a full, clear, and exact description of the same.

The object of the present invention is to remove the silk-like skin from the coffee-berry without injury thereto, while at the same time freeing the berry of such dirt or foreign substance as may adhere thereto, and this without in any manner whatever affecting the flavor of the berry. The silk-like skin desired to be removed is that covering of the berry which surrounds the same when within its shell or husk and which remains thereon after the husk or shell has been removed. Ordinarily the berry is placed upon the market with this skin or covering thereon or with such portion thereof as can be removed during the polishing process of the berry.

In carrying out our invention we make employment of any suitable revolving or stirring machinery, preferably the style illustrated in the drawings, wherein—

Figure 2:
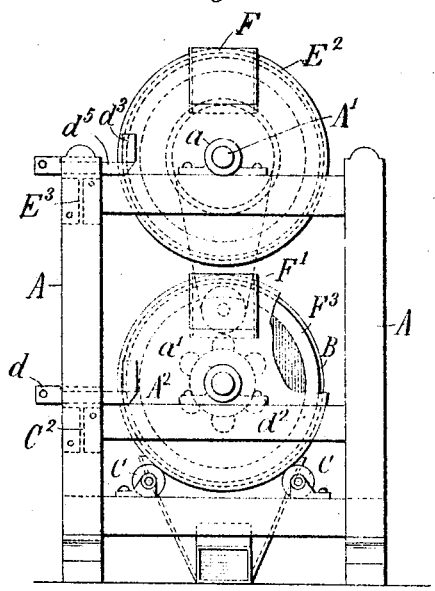

Figure 1 is front view in elevation of a cleaning apparatus, partly broken away; and Fig. 2, an end view of the same.

In the drawings the apparatus consists of a rotating drum or casing A, preferably composed of reticulated material. This drum is loosely mounted upon the shaft $A'$, which shaft is provided with a series of knobs or projections $a$. The drum is driven by means of the pulley-belt $A^2$, which works over belt-wheel $a'$, secured to power-shaft $A^3$, and periphery $a^2$ of the drum. The central shaft $A'$, which supports the drum, has imparted thereto an opposite rotation to that given drum A, said shaft being driven by means of a suitable belt B, working over belt-wheel $B'$, secured to the power-shaft $A^3$, and belt-wheel $B^2$, secured to shaft $A'$. The material to be treated is fed into one end of the drum.

The berry to be treated is first subjected to moisture or has water sprayed thereon in order to soften or loosen the covering thereof, likewise any dirt or foreign matter adhering thereto. Care must be taken that the coffee be not unduly moistened, else the moisture will penetrate the berry and cause a swelling thereof and cause a spoiling of the same. For such reason we only permit the berry to remain in the water sufficient time in which to moisten the outer skin to be removed—say a couple of minutes. After this moistening of the berry it is required that the excess of moisture be removed, and for this purpose we intermix with the moistened berry an absorbent, as sawdust or similar material. The coffee-berries are thoroughly stirred, so as to permit the absorbent material to intermix therewith. This absorbent takes up the excess of moisture and prevents the same soaking or penetrating into the berry and injuring same. The moistening softens the outer skin or covering of the berry and such foreign material as may be thereon and renders the separation thereof comparatively an easy matter. The prepared or partially-treated berries, with the absorbent material intermixed therewith, are then placed within a suitable stirring apparatus—as, for instance, the drum A—and subjected to the action thereof for a period of about thirty minutes. The time of the final step of the process is dependent greatly upon the speed of stirring. As the cylinder A is revolved the material fed therein is carried around, thoroughly intermixed, and the berries subjected to frictional contact. This tumbling and rapid stirring of the berries serves to remove the softened skin therefrom, likewise all foreign matter. As the skin and dirt are removed the same, together with the absorbent powder, are discharged through the openings of the casing, while at the same time the air drawn therein serves to gradually dry the moistened berries. During this stirring step of the process all foreign substance and the previously-loosened skin are removed by attrition, while at the same time the rubbing incident thereto answers to highly polish the berries.

The qualities which render sawdust particularly effective in carrying out the foregoing process are, first, its capability of absorbing moisture, so that it will take up the moisture from the berries during treatment; second, its granular form whereby it will intimately mix with the berries without permanently adhering thereto, and, third, its abrasive qualities, whereby when thoroughly agitated with the berries it will remove the already-softened outer skin by attrition. To carry out our invention, therefore, we employ sawdust or similar material having like qualities.

While we prefer to attrite the berries within a rotating perforated or reticulated cylinder, (as by so doing the removed substance is discharged through the openings of the cylinder, and thus separated from the cleaned and polished berries,) still we do not wish to be so confined, as the loosened skin and substance may be finally removed by the rapid stirring of the berries in any suitable manner.

It will be understood that our treatment of the berry takes place prior to the roasting of the coffee-berries.

Having thus described our invention, what we claim, and desire to secure protection in by Letters Patent, is—

The herein-described method of treating coffee-berries, which consists in first moistening the berries sufficiently to soften the outer skin, and in then mixing dry sawdust with the berries so moistened and thoroughly agitating the mixture.

In witness whereof we have hereunto set our hands.

W. A. HASTINGS.
NEAL J. HARRINGTON.

Witnesses as to signature of W. A. Hastings:
M. F. COOPER,
ARTHUR LEIGH.

Witnesses as to signature of Neal J. Harrington:
A. J. KILLEEN,
W. L. LAURENCE.